(12) United States Patent
Salamon et al.

(10) Patent No.: US 11,501,102 B2
(45) Date of Patent: Nov. 15, 2022

(54) AUTOMATED SOUND MATCHING WITHIN AN AUDIO RECORDING

(71) Applicant: Adobe Inc., San Jose, CA (US)

(72) Inventors: Justin Salamon, San Francisco, CA (US); Yu Wang, Brooklyn, NY (US); Nicholas J. Bryan, Belmont, CA (US)

(73) Assignee: Adobe Inc., San Jose, CA (US)

( * ) Notice: Subject to any disclaimer, the term of this patent is extended or adjusted under 35 U.S.C. 154(b) by 438 days.

(21) Appl. No.: 16/691,205

(22) Filed: Nov. 21, 2019

(65) Prior Publication Data

US 2021/0158086 A1 May 27, 2021

(51) Int. Cl.
*G06K 9/62* (2022.01)
*G06N 3/08* (2006.01)
*G06N 3/04* (2006.01)
*G06F 7/78* (2006.01)
*G06F 17/16* (2006.01)
*G06F 16/68* (2019.01)
*G06N 3/02* (2006.01)

(52) U.S. Cl.
CPC ......... *G06K 9/6231* (2013.01); *G06F 16/686* (2019.01); *G06K 9/629* (2013.01); *G06K 9/6221* (2013.01); *G06K 9/6263* (2013.01); *G06N 3/02* (2013.01)

(58) Field of Classification Search
CPC .. G06K 9/6231; G06K 9/6221; G06K 9/6263; G06K 9/629; G06F 16/686; G06N 3/02
See application file for complete search history.

(56) References Cited

U.S. PATENT DOCUMENTS

| 2013/0255473 A1* | 10/2013 | Abe .................... G10H 1/06 84/605 |
| 2020/0349921 A1* | 11/2020 | Jansen ................. G10L 15/063 |
| 2022/0067557 A1* | 3/2022 | Donaldson ............ G06F 16/24 |

OTHER PUBLICATIONS

Bello, et al., "Sonyc: A System for Monitoring, Analyzing, and Mitigating Urban Noise Pollution," Commun. ACM, vol. 62, No. 2, pp. 68-77, Jan. 2019.

(Continued)

*Primary Examiner* — David F Dunphy
(74) *Attorney, Agent, or Firm* — Kilpatrick Townsend & Stockton LLP

(57) ABSTRACT

Certain embodiments involve techniques for automatically identifying sounds in an audio recording that match a selected sound. An audio search and editing system receives the audio recording and preprocesses the audio recording into audio portions. The audio portions are provided as a query to the neural network that includes a trained embedding model used to analyze the audio portions in view of the selected sound to estimate feature vectors. The audio search and editing system compares the feature vectors for the audio portions against the feature vector for the selected sound and the feature vector for the negative samples to generate an audio score that is a numerical representation of the level of similarity between the audio portion and the selected sound and uses the audio scores to classify the audio portions into a first class of matching sounds and a second class of non-matching sounds.

20 Claims, 8 Drawing Sheets

(56) References Cited

OTHER PUBLICATIONS

Salamon, et al., "A Dataset and Taxonomy for Urban Sound Research," in Proceedings of the 22Nd ACM International Conference on Multimedia, New York, NY, USA, 2014, MM '14, pp. 1041-1044, ACM.
Foggia, et al., "Reliable Detection of Audio Events in Highly Noisy Environments," Pattern Recogn. Lett., vol. 65, No. C, pp. 22-28, Nov. 2015.
Diment, et al., "Tut Rare Sound Events, Development Dataset," Zenodok, Mar. 2017, retrieved from https://zenodo.org/record/1160455#.XnKXqYhKjL4, all pages.
Gencoglu, et al., "Recognition of Acoustic Events Using Deep Neural Networks," in 2014 22nd European Signal Processing Conference (EUSIPCO), Sep. 2014, pp. 506-510.
K. J. Piczak, "Environmental Sound Classification with Convolutional Neural Networks," in 2015 IEEE 25th International Workshop on Machine Learning for Signal Processing (MLSP), Sep. 2015, pp. 1-6.
H. Zhang, et al., "Robust Sound Event Recognition Using Convolutional Neural Networks," in 2015 IEEE International Conference on Acoustics, Speech and Signal Processing (ICASSP), Apr. 2015, pp. 559-563.
G. Parascandolo, et al., "Recurrent Neural Networks for Polyphonic Sound Event Detection in Real Life Recordings," 2016 IEEE International Conference on Acoustics, Speech and Signal Processing (ICASSP), pp. 6440-6444, 2016.
E. Cakir, et al., "Convolutional Recurrent Neural Networks for Polyphonic Sound Event Detection," IEEE/ACM Trans. Audio, Speech and Lang. Proc., vol. 25, No. 6, pp. 1291-1303, Jun. 2017.
B. Kim, "A Human-ln-The-Loop System for Sound Event Detection and Annotation," ACM Trans. Interact. Intell. Syst., vol. 8, No. 2, pp. 13:1-13:23, Jun. 2018.
J. Pons, et al., "Training Neural Audio Classifiers with Few Data," in ICASSP 2019 - 2019 IEEE International Conference on Acoustics, Speech and Signal Processing (ICASSP), May 2019, pp. 16-20.
S. Chou, et al., "Learning to Match Transient Sound Events Using Attentional Similarity for Few-Shot Sound Recognition," in ICASSP 2019—2019 IEEE International Conference on Acoustics, Speech and Signal Processing (ICASSP), May 2019, pp. 26-30.
S. Zhang, et al., "Few-Shot Audio Classification with Attentional Graph Neural Networks," in Proc. Interspeech 2019, 2019, pp. 3649-3653.
L. Fei-Fei, et al.,., "One-Shot Learning of Object Categories," IEEE Trans. Pattern Anal. Mach. Intell., vol. 28, No. 4, pp. 594-611, Apr. 2006.
A. Santoro, et al., "Meta-Learning with Memory-Augmented Neural Networks," in Proceedings of the 33rd International Conference on International Conference on Machine Learning—vol. 48, 2016, ICML'16, pp. 1842-1850.
T. Munkhdalai , et al., "Meta Networks," in Proceedings of the 34th International Conference on Machine Learning—vol. 70, 2017, ICML'17, pp. 2554-2563.
C. Finn, et al., "Model-Agnostic Meta-Learning for Fast Adaptation Of Deep Networks," in Proceedings of the 34th International Conference on Machine Learning—vol. 70, 2017, ICML'17, pp. 1126-1135.
S. Ravi, et al., "Optimization as a Model for Few-Shot Learning," in 5th International Conference on Learning Representations, ICLR 2017, Toulon, France, Apr. 24-26, 2017, Conference Track Proceedings, 2017, 11 pages.
V. G. Satorras and J. B. Estrach, "Few-Shot Learning With Graph Neural Networks," in International Conference on Learning Representations, Feb. 20, 2018, 13 pages.
G. R. Koch, et al., "Siamese Neural Networks for One-Shot Image Recognition," in ICML Workshop, vol. 2. 2015, 8 pages.
O. Vinyals, et al., "Matching Networks for One Shot Learning," in Advances in Neural Information Processing Systems 29, pp. 3630-3638. Dec. 29, 2016.
J. Snell, et al., "Prototypical Networks for Few-Shot Learning," in Advances in Neural Information Processing Systems 30, pp. 4077-4087, Jun. 19, 2017, 13 pages.
F. Sung, et al., "Learning To Compare: Relation Network For Few-Shot Learning," in 2018 IEEE/CVF Conference on Computer Vision and Pattern Recognition, Jun. 2018, pp. 1199-1208.
J. Bromley, et al., "Signature Verification Using a "Siamese" Time Delay Neural Network," in Proceedings of the 6th International Conference on Neural Information Processing Systems, San Francisco, CA, USA, 1993, NIPS'93, pp. 737-744.
Y. Taigman, et al., "DeepFace: Closing the Gap to Human-Level Performance in Face Verification," in 2014 IEEE Conference on Computer Vision and Pattern Recognition, Jun. 2014, pp. 1701-1708.
W. Chen, et al., "A Closer Look at Few-Shot Classification," in International Conference on Learning Representations, Jan. 12, 2019, 17 pages.
A. Köhn, et al., "Mining the Spoken Wikipedia for Speech Data and Beyond," in Proceedings of the Tenth International Conference on Language Resources and Evaluation (LREC 2016), Paris, France, May 2016, 4 pages.
McFee, et al., "librosa/librosa: 0.7.0,", Zenodo, DOI 10.5281/zenoda.3270922, Jul. 2019, all pages.

* cited by examiner

AUTOMATED SOUND MATCHING WITHIN AN AUDIO RECORDING

TECHNICAL FIELD

This disclosure relates generally to computer-implemented methods and systems for audio processing. Specifically, the present disclosure involves automatically identifying matching sounds in an audio recording using one or more examples of the sound in one or more audio recordings.

BACKGROUND

Content creators frequently edit audio recordings and/or need to identify particular sounds in audio recordings. For example, content creators sometimes edit out particular sounds from audio recordings (e.g., filler sounds such as "ah" or "um") or sometimes synchronize motion graphics to particular sounds in an audio recording. To edit out the sounds or mark the location of the sounds in the audio recording for synchronizing, the content creator must identify the location of each sound of interest within the audio recording. Identifying the location of each sound using prior systems is a manual and tedious task.

BRIEF SUMMARY

Certain embodiments involve techniques for automatically identifying, in an audio recording having audio portions (e.g., audio segments or audio frames), matching sounds of a selected sound in the audio recording. In one embodiment, an audio search and editing system estimates, using a neural network, feature vectors including numerical representations of the audio portions, respectively. The neural network is trained to estimate the feature vectors, which is a vector of extracted features of the audio portions. The audio search and editing system further compares the feature vectors associated with the audio portions, respectively, to a positive feature vector representing the positive (selected) samples (e.g., the feature vectors of the positive samples are combined using a weighted average function or a learned function to generate the positive feature vector) to generate an audio score (similarity score) associated with the audio portions, respectively. The audio search and editing system may also compare the feature vectors associated with the audio portions, respectively, to a negative feature vector representing negative samples as part of generating the audio score associated with the audio portions. The audio search and editing system classifies, with the audio scores, a first subset of the audio portions into a first class representing a match with the selected audio portions and a second subset of the audio portions into a second class representing no match with the selected audio portions. The audio search and editing system outputs the classification of the audio portions. Embodiments of this aspect include corresponding computer systems, apparatus, and computer programs recorded on one or more computer storage devices, each configured to perform the actions of the techniques.

In additional or alternative embodiments, the neural network uses at least some of the audio portions as negative samples for estimating the feature vector representation for the negative class. Optionally, the feature vectors associated with the selected audio portions are used to generate the selected feature vector. Optionally, the audio search and editing system time shifts the selection of the selected audio portions to generate additional selected audio portions, where the neural network uses the additional selected audio portions as positive samples for estimating the feature vectors representing the positive class. Optionally, the audio search and editing system receives user feedback on the classification of the audio portions and estimates, using the neural network, updated feature vectors of the audio portions, respectively. The neural network uses the user feedback (i.e. in the form of labeled positive and/or negative examples) for estimating the feature vectors and to identify and present changes to the positive samples and/or to the negative samples to the user. Optionally, the audio portions may overlap other audio portions. Optionally, the audio search and editing system uses post-processing methods such as peak detection for segmenting the predicted similarity score curve on the first and second subsets. Optionally, a user selects the selected audio portions. Optionally, the audio search and editing system converts the audio recording into a spectrogram (e.g., a mel-spectrogram) and generates the audio portions by selecting frames of the spectrogram. Optionally, the audio search and editing system deletes the matching audio portions from the audio recording. Optionally, the audio search and editing system performs key frame generation with the matching audio portions from the audio recording. Implementations of the described techniques may include hardware, a method or process, or computer software on a computer-accessible medium.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
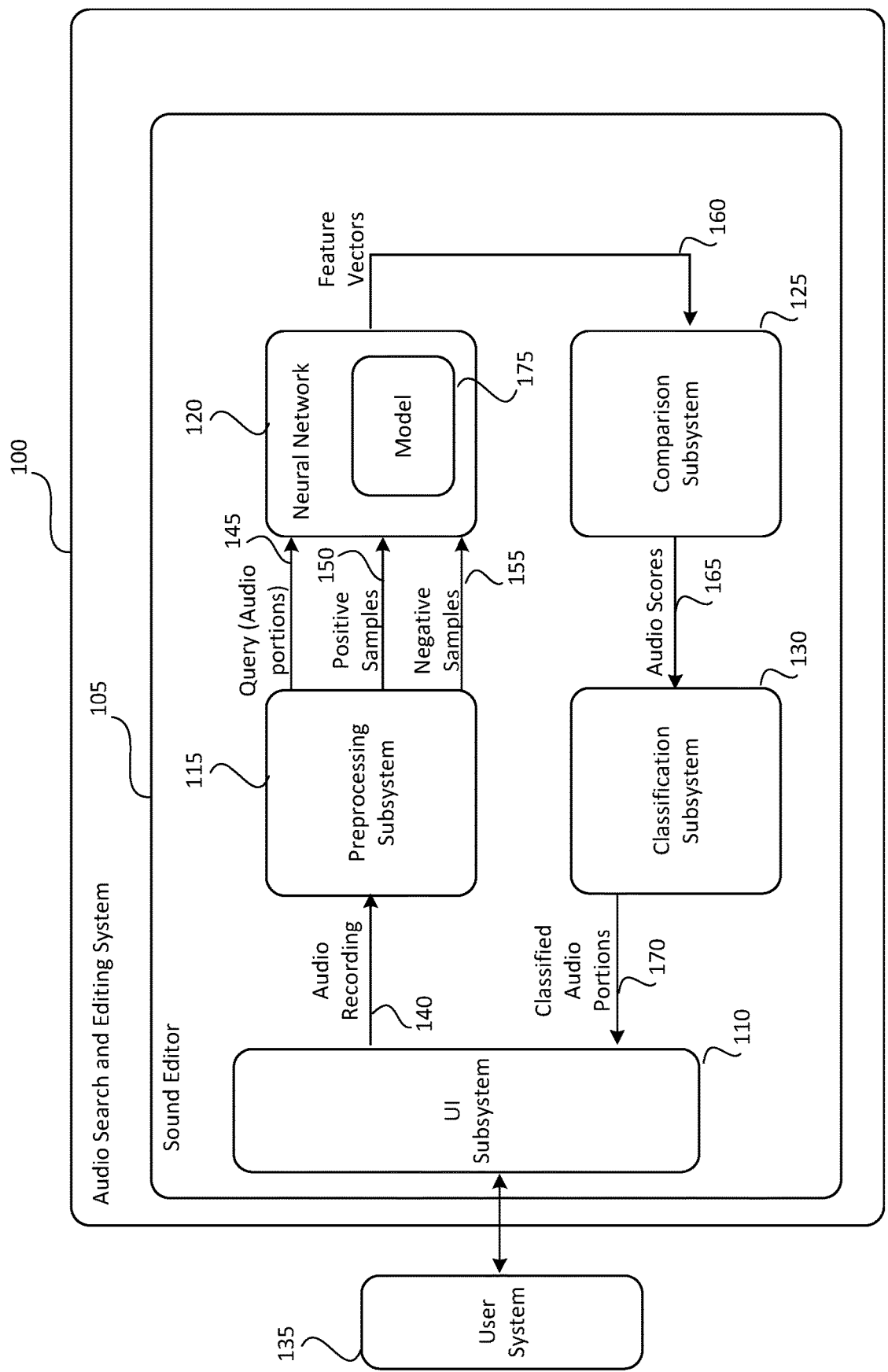
FIG. 1 depicts an example of an audio search and editing system for automatically identifying matching sounds in an audio recording, according to certain embodiments.

The present disclosure involves automatically identifying matching sounds in an audio recording using a neural network. As discussed above, to locate a particular sound in an audio recording typically involves a user identifying each particular instance of the sound of interest. Existing techniques for locating the particular sounds in the audio recording typically involve a person listening to the entire recording and manually labeling all the locations of the particular sound within the recording. This is a challenge for users because the task is time consuming, tedious, and error prone. The embodiments described herein automate the process of identifying sounds based on selection of one or a few examples of the sound in the audio recording.

The following non-limiting example is provided to introduce certain embodiments. In this example, an audio search and editing system (e.g., a computer system executing audio editing software) may access an audio recording to be edited. The audio search and editing system may provide, in a user interface, a visual representation (e.g., waveform and/or a spectrogram) of the audio recording to a user for selection of one or more examples of a sound in the audio recording. In some embodiments, the spectrogram is a mel-spectrogram generated by pre-processing the audio recording. A mel-spectrogram is generated by using the mel-scale as the y-axis of a spectrogram. The mel-scale is a scale created to separate frequencies into evenly spaced bins where the bins are not evenly spaced based on distance in the frequency dimension, but on distance as it is heard by the human ear. A spectrogram is a representation of the spectrum of frequencies of a signal as it varies with time. The mel-spectrogram is divided into audio portions of, for example, 0.5 seconds each. The audio portions may overlap each other or be discrete from each other.

Continuing with this example, the audio search and editing system uses a trained neural network to service a query for matching sounds in the audio recording. For instance, the audio search and editing system provides, to the neural network, all of the audio portions of the audio recording as the query. The audio search and editing system also provides positive samples and negative samples of the selected sound to the neural network. The positive samples are selected by the user from the waveform or other visual representation of the audio recording. For example, the audio recording may be a 25-minute speech recording, and the user may select the first one or two examples of the speaker saying "um." The audio search and editing system also provides at least some of the audio portions as negative samples to the trained neural network. For instance, the audio search and editing system may use all of the audio portions as negative samples.

The neural network is pre-trained using few-shot learning techniques to generate and output feature vectors such that the distance between two feature vectors indicates a similarity of the associated audio portions. In some embodiments, the neural network includes a comparison module. The feature vectors output by the neural network are provided to the comparison module (i.e., comparison subsystem) that generates an audio score for audio portions, respectively, based on comparison of the audio portion feature vectors with the positive sample feature vectors and with the negative sample feature vectors. The audio scores are used to classify the audio portions into a matching class, which includes audio portions with a closer similarity to the positive samples, or a non-matching class, which includes audio portions with less similarity to the positive samples. The audio search and editing system can provide classifications of the audio portions to the user interface for viewing by the user, thereby allowing the user to identify a set of audio portions matching the selected audio portions (e.g., the audio portions with "um" or a similar sound).

Embodiments described herein provide improvements over existing sound identification and matching and techniques. For instance, a process for identifying matching sounds within an audio recording with little user effort can use a neural network trained with few-shot learning techniques to generate feature vectors for audio portions such that distance between feature vectors indicate a level of similarity between the audio portions and the selected sound. The feature vectors can be used for comparing with the feature vectors of the selected sound to automatically identify and mark matching occurrences of the sound. The user is spared the tedious task of listening to the entire audio recording to manually identify and mark each occurrence of the sound of interest in the audio recording. Instead, the user need only select one or a few occurrences of the sound, and the system can use the selections to automatically identify the matching occurrences in the audio recording.

Referring to the drawings, FIG. 1 illustrates an example of an audio search and editing system 100 that may be used to automatically identify matching sounds to a selected sound in an audio recording. Audio search and editing system 100 may be any suitable computing system such as, for example, computing device 800 of FIG. 8 or server computer 705 of FIG. 7 in cloud computing environment 700. Audio search and editing system 100 may be separate from user system 135, or may be incorporated into a single user system 135. Stated differently, audio search and editing system 100 may be an application on a user system 135 or accessed remotely by user system 135. User system 135 may be any suitable computing device such as, for example, computing device 800 of FIG. 8. A user can utilize user system 135 to edit and create audio recordings and specifically automatically identify matching sounds to a selected sound within an audio recording as described in more detail herein. As will be described further herein, while the word matching is used throughout, the matched sounds do not have to be perfectly identical. Rather, a level of similarity of audio characteristics is used to identify those sounds that are sufficiently similar to likely match.

Audio search and editing system 100 includes a sound editor 105. Audio search and editing system 100 may include other components, such as, for example, memory, a processor, and the like. However, the other components are omitted from FIG. 1 for simplicity of illustration and description. Sound editor 105 may be a software application used to create and edit audio recordings. The sound editor 105 includes a user interface (UI) subsystem 110 that allows the user accessing user system 135 to interface with the sound editor 105. The UI subsystem 110 provides a graphical user interface to the user for creating and editing audio recordings with the sound editor 105.

Sound editor 105 further includes preprocessing subsystem 115, neural network 120, comparison subsystem 125, and classification subsystem 130. The preprocessing subsystem 115 receives the audio recording from the UI subsystem 110 as shown by arrow 140. The preprocessing subsystem processes the audio recording in preparation for use by the neural network 120. The audio recording may be any suitable audio recording which may be, for example, recorded by the user using the UI subsystem or selected by the user from an audio source. In some embodiments, the audio recording may be more than one audio recording. For example, more than one audio recording may be concatenated together (e.g., end-to-end). When the audio recordings have similar content and similar acoustic conditions little degradation in the quality of the analysis described herein will occur. The preprocessing subsystem 115 receives the audio recording and performs preprocessing to generate a query composed of audio portions of the audio recording, positive samples of the sound the user would like to identify in the audio recording, and negative samples of sounds. An embodiment of the preprocessing subsystem 115 is provided with more detail with respect to FIG. 2.

The neural network 120 receives the query as shown by arrow 145, the positive samples as shown by arrow 150, and the negative samples as shown by arrow 155. The neural network 120 can be a neural network 120 trained using one- or few-shot learning techniques. Few-shot or one-shot training involves the practice of training a neural network with large amounts of training data, but in a way that simulates only using small amounts of training data (e.g., tens of labeled sets). That way, once the network is trained, it can perform classification on new class types using only a small number of labeled examples. In embodiments described herein, few-shot neural networks are adapted for use to classify audio portions. Few-shot neural networks are based on the concept that reliable algorithms can be developed to make predictions on small data sets. The paradigm of few-shot learning is aimed at learning a model 175 that can detect previously unseen classes (i.e., classes not included in the training data), given very few labeled examples of the new class. Specifically, the few-shot learning paradigm defines an N-way K-shot classification problem as the task of labeling the query (audio portions) with one of N class labels (closed set labeling), given K labeled examples per class.

As described above, the neural network 120 is trained to compute a feature vector (also known as an embedding vector) for a particular audio recording, where feature vectors outputted by the neural network define points in the feature space. The learned feature space (also called an embedding space herein) is learned during training, and each new audio recording is analyzed within the learned feature space by mapping each of the audio portions to a feature vector in the feature space. The neural network 120, by learning the embedding space, can thereby generate feature vectors from the embedding space such that distances between the feature vectors indicate similarity or dissimilarity between them.

In some embodiments, training of the neural network 120 is divided into episodes such that during each episode, the neural network 120 is provided with a support set of audio portions consisting of a limited number of examples per each of N classes (e.g., for the set [dog, cat, cow], N=3). The number of example per class defines the number of "shots" (K) (e.g., for one example per class, shots=K=1). In each episode, the neural network 120 is also provided with one or more queries which belong to one of the N classes included in the support set. The neural network 120 maps each example in the support set to a feature vector and uses a weighted average function, a max function, or another learned function of all the feature vectors for a single class to obtain a single feature vector representing each class. The neural network 120 also maps each of the queries to a feature vector. The comparison subsystem 125 then computes the distance between a query vector and each of the averaged class vectors, using either a fixed comparison function or a learned function. In embodiments in which the comparison is a learned function, the comparison subsystem 125 is part of the neural network 120. Each comparison results in an audio score or, in some embodiments, a distance measurement. The classification subsystem 130 checks if the distance between the query feature vector and the average feature vector of the correct class (i.e., the known correct class) is the smallest distance. If the distance is not the smallest, the weights of the neural network 120 are updated to push the neural network 120 to produce feature vectors that provide the correct result. Another episode is then completed using the above process such that there are multiple training episodes. In each episode, a different group of classes may be used with a different support set and different queries. Episodes are performed until the training converges using a validation set. For example, after each episode a validation set is used to test the performance of the neural network. If the performance goes down, training continues with another episode. After multiple episodes in which the performance does not go down, training is stopped and the neural network 120 is considered trained and is deployed for use.

As described above, the neural network 120 uses metric-based few-shot learning techniques with episodic training. Deep learning-based models are trained to learn a model 175 such that when represented in such model 175, similar sounds are easy to recognize using a fixed or learned metric function. Model 175 includes one or more functions for generating, from an audio portion, a feature vector in a feature space such that the similarity of the audio portion to another audio portion can be determined from distances within the feature space. Examples of such a fixed metric function are Euclidean distance metric, normalized Euclidean distance metric, and cosine distance. Learned metric functions are learned during training by the neural network 120. Similar sounds are easy to recognize because, for example, using the model 175 to represent these sounds in a feature space allows distances in the feature space to be used as a measure of similarity. During runtime, to generate a set of labeled segments (closed set labels), the positive samples (user selected audio portions) are used as a first class (matching class), and negative samples (some or all of the audio portions) are used as a second class (non-matching class). Using the trained model 175 and the labeled segments, the neural network 120 analyzes the query (audio portions) and generates a feature vector for each audio portion, some of which are identified as positive samples and some or all of which are identified as negative samples. Each of the audio portions are identified as queries. The distance between the feature vectors of the audio portions and the positive samples indicate a level of similarity between the respective audio portions and the positive samples. Due to the nature of neural network 120, during training of neural network 120 the features of the audio portions that are important to humans are learned, which are the features that are used for the neural network 120 to determine that two sounds are perceptually similar.

The comparison subsystem 125 receives the feature vectors as shown by arrow 160 and generates audio scores or, in some embodiments, distance measurements for respective audio portions of the audio recording. The comparison subsystem 125 is depicted as a separate subsystem from neural network 120, though in some embodiments, comparison subsystem 125 may be a layer of the neural network 120. More specifically, comparison subsystem 125 can be a submodule within the neural network 120 that follows the trained model 175. Comparison subsystem 125 generates an audio score (or distance measurement) based on comparing the respective feature vector of the audio portion with the feature vector representing the positive sample and the feature vector representing the negative sample. When generating an audio score, generally a larger score indicates the two feature vectors are more similar, and when generating a distance measurement, a larger value indicates the two feature vectors are less similar. For instance, a positive audio score (or other similarity measurement) indicates a probability that the audio portion is a positive (i.e., a match), and a negative audio score (or other similarity measurement) indicates a probability that the audio portion is a negative (i.e., not a match). In some embodiments, more than one positive sample is provided. In such embodiments, the feature vectors for the positive samples are combined using, for example, a weighted average function, a max function, or another learned function to generate a positive feature vector to compare against each audio portion feature vector. The feature vectors for the negative samples are also combined using, for example, a weighted average function, a max function, or another learned function to generate a single negative feature vector for comparison. In some embodiments, all audio portions of the audio recording are used as negative samples, negative samples are provided by the user, or some number (e.g., a random subset) of the audio portions of the audio recording are used as negative samples. The feature vector of the audio portion being analyzed is compared against the positive sample feature vector to generate a positive distance and against the negative sample feature vector to generate a negative distance. The positive and negative distances can be processed through a softmax function to convert them into probabilities between 0 and 1, which sum to 1. This can be achieved by taking the negative of the distance values (e.g., a distance of 5 is converted to −5) and then applying the softmax function to the negative distance values. Larger distances will result in smaller probabilities when applying the softmax function to the negatives of these larger distance values. Accordingly, a small distance will result in a larger probability, and conversely a large distance will result in a small probability. If the probability obtained for the positive class is large, the probability for the negative class will be small, as the combined sum of these probabilities will sum to 1. A high probability for the positive class indicates the audio portion is a match, whereas a high probability for the negative class indicates the audio portion is not a match. For a given audio portion, the probability that is higher (either positive or negative) may be used to determine whether the audio portion is a match or not. In some embodiments, rather than combining the feature vector of the positive samples and combining the feature vector of the negative samples, the feature vector of the audio portion can be compared against each positive feature vector and against each negative feature vector. In such embodiments, for example, the distance measurements calculated between the audio portion feature vector and the positive feature vectors can be combined using, for example, a weighted average function, a max function, or some other learned function, and the distance measurements between the audio portion feature vector and the negative feature vectors can be combined using, for example, a weighted average function, a max function, or some other learned function.

The audio scores (or distance measurements) are sent to classification subsystem 130 as shown by arrow 165. The classification subsystem 130 is depicted as a separate subsystem from neural network 120, though in some embodiments, classification subsystem 130 may be a layer of the neural network 120. Classification subsystem 130 analyzes the audio scores to classify each of the audio portions into one of two classes (i.e., the matching class or the non-matching class). For example, when analyzing an audio portion, if the positive audio score and negative audio score indicates the distance between the audio portion feature vector and the positive sample feature vector are closer than the distance between the audio portion feature vector and the negative sample feature vector, the classification subsystem 130 classifies the audio portion as a match. If the classification subsystem 130 determines that the distance between the negative sample feature vector and the audio portion feature vector is smaller than the distance between the positive sample feature vector and the audio portion feature vector, the classification subsystem 130 will classify the audio portion as a non-match. The classification subsystem 130 may use a threshold value of the audio score to classify each audio portion such that, for example, any audio portions having an audio score exceeding the threshold are classified as a match and all others are classified as a non-match. The threshold value may optionally be set by the user. In some embodiments, classification subsystem 130 can use peak detection to determine which audio portions are a match to the selected audio portions (i.e., positive samples) based on the audio scores. For example, the audio scores that were normalized can be used to generate a probability curve. Peaks can be identified (i.e., any value that has a lower value before and after it is a peak, in the sequence 12321, 3 is a peak), and these peaks are used to identify the center time region of the matching content (i.e., match class). To the left and right of the peak detection are the beginning and end regions of the matched content.

The classified audio portions are provided to the UI subsystem 110 as shown by arrow 170. The UI subsystem 110 may then provide a depiction of the audio recording with the identified audio portions marked, as shown for example in FIG. 3. In some embodiments, the UI subsystem may provide at least some (e.g., 5) of the audio portions in the matching class to the user. In some embodiments, the UI subsystem may also provide some of the audio portions in the non-matching class to the user. The user may provide feedback by confirming or rejecting the classification of one or more of the audio portion classifications. The UI subsystem can provide the updated classification information to the preprocessing subsystem 115, which can update the positive samples, the negative samples, or both, and neural network 120 can re-analyze the query (audio portions) in view of the updated positive samples and/or negative samples. More specifically, the feature vectors for each portion of the audio recording are reused, however those that are used as the positive samples or negative samples may be updated based on the user input. Therefore, for example, if the user identifies a non-matched portion as a match, the positive feature vector can be re-estimated by including the feature vector for the incorrectly classified portion as a positive sample, and using that feature vector in the combination with other positive feature vectors. The comparison subsystem 125 can use the updated positive feature vector to re-compare against the audio portion feature vectors to generate new audio scores for the audio portions, respectively. The classification subsystem 130 can classify the audio portions based on the new audio scores and provide the updated classifications to the UI subsystem 110. This process can be repeated once or, for example, until the classifications shown to the user are all accepted.

Figure 2:
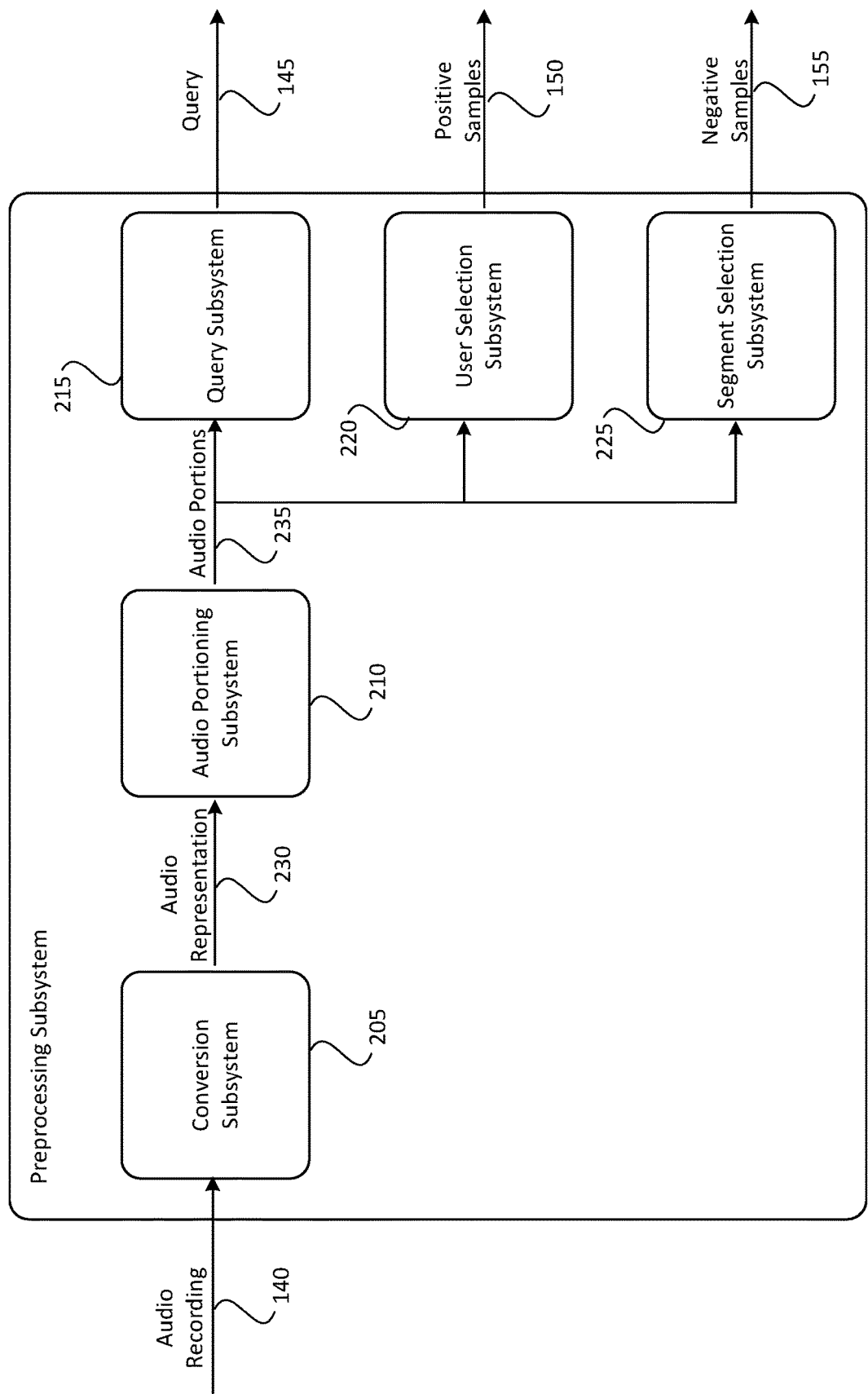
FIG. 2 depicts an example of the preprocessing portion of the audio search and editing system for identifying matching sounds, according to certain embodiments.

FIG. 2 illustrates an example of preprocessing subsystem 115 with additional detail. The preprocessing subsystem 115 includes a conversion subsystem 205, an audio portioning subsystem 210, a query subsystem 215, a user selection subsystem 220, and a segment selection subsystem 225. More or fewer components may be used within preprocessing subsystem 115 to perform the described functionality without departing from the scope of this disclosure. Preprocessing subsystem 115 receives the audio recording, as shown by arrow 140, and processes the audio recording in preparation for the neural network 120. Specifically, the audio recording is converted into an audio representation of the audio recording by conversion subsystem 205. The audio representation is a format that is useable by the neural network 120. For example, the audio recording is converted into a mel-spectrogram. The audio representation is provided to the audio portioning subsystem 210 as shown by arrow 230.

The audio portioning subsystem 210 partitions the audio representation into audio portions. For example, the audio representation may be partitioned into 0.5-second increments (i.e., half a second frames). In some embodiments, the audio portions may overlap each other, such that each audio portion increment is not isolated from each other audio portion increment. For example, the first audio portion may be, starting from time 00:00 (mm:ss), 00:00 to 00:05, and the second audio portion may be 00:04 to 00:09. In some embodiments, the audio portions are not partitioned into equal time increments. In some embodiments, the amount of overlap between audio portions may not be equal for each overlapping portion. The audio portions are provided to the query subsystem 215, the user selection subsystem 220, and the segment selection subsystem 225 as shown by arrow 235.

Query subsystem 215 passes all of the audio portions as the query to the neural network 120 as shown by arrow 145. The audio portions of the entire audio recording are the basis of the query, so each of the portions are sent such that the neural network 120 analyzes each audio portion as an independent query.

User selection subsystem 220 utilizes the UI subsystem 110 to provide a visual and audio representation of the audio portions to the user for selection of one or more audio portions. The selected audio portion is a selection of the sound the user is attempting to identify throughout the audio recording. The user may select more than one audio portion containing the sound. For example, if the user is looking for a specific drumbeat within a musical audio recording to synchronize a character animation to, the user may select two or three audio portions (i.e., frames) having the drumbeat that the user is looking for throughout the audio recording. In some embodiments, the user will select only a single audio portion containing the sound. The user selection subsystem 220 may then provide the user selected audio portions as the positive samples as shown by arrow 150. In some embodiments, the user selection subsystem will time shift the selection of the selected audio portion within the recording to generate multiple positive samples from a single user selection. For example, if the user selects a 0.5 second audio portion, multiple positive samples can be generated by time shifting the selection of the selected audio portion left and right in the audio recording by 0.05 second increments to still have substantial overlap with the selected audio portion, but it will be slightly different so that multiple (e.g., 5) positive samples are generated from a single user selection. In this way, for example, the user may select two audio portions, but the user selection subsystem 220 may generate ten positive samples.

Segment selection subsystem 225 may select audio portions to provide as negative samples as shown by arrow 155. In some embodiments, the segment selection subsystem may randomly select a number of audio portions to provide as negative samples. In some embodiments, all audio portions may be provided as negative samples. In such embodiments, even though some of the audio portions are positive samples, the majority of audio portions are not, so the classification system still provides quality results. Testing of the system has shown that using all portions of the audio recording as negative samples provides the best performance as compared to using a random subset of the audio portions as negative samples. Using one of these techniques removes the obligation of the user to label audio portions as negative samples.

Figure 3:
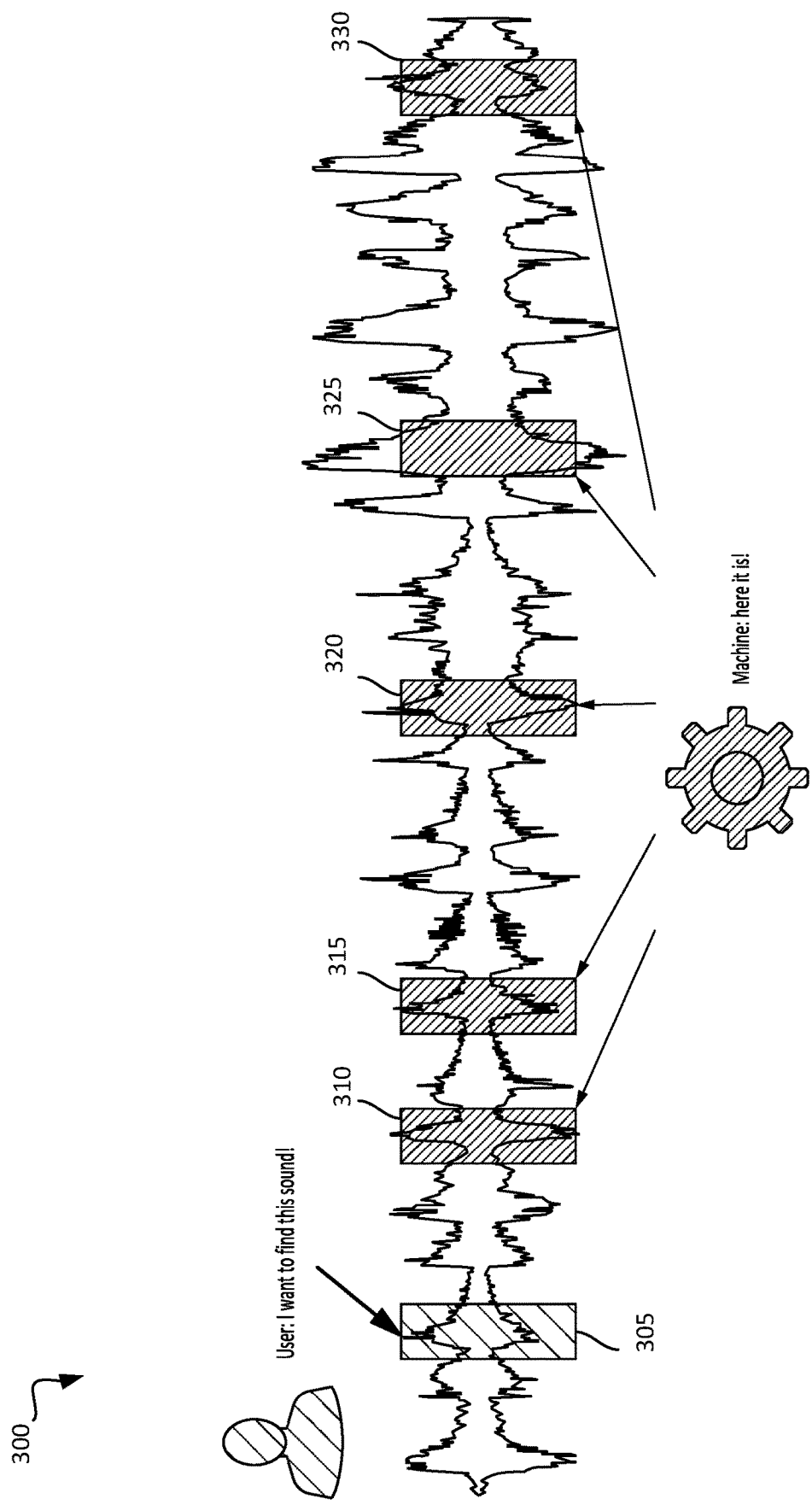
FIG. 3 depicts an example of an audio waveform with a user selection and identified selections from the audio search and editing system, according to certain embodiments.

FIG. 3 illustrates an example of a waveform 300 of an audio recording depicting user selection 305 and automatic detection of matching audio portions 310, 315, 320, 325, and 330. The waveform 300 may be displayed to the user for selection of the user selection 305 by, for example, user selection subsystem 220 in conjunction with UI subsystem 110 as described above. The user may select a single user selection 305 or may select more than one user selections 305. The preprocessing subsystem 115 may generate the query (audio portions), positive samples, and negative samples from the waveform 300. The neural network 120 may generate feature vectors for each of the audio portions and each of the positive samples and negative samples, and the comparison subsystem 125 may generate audio scores for the respective audio portions based on comparing the feature vectors for the audio portions with the feature vector for the positive samples and negative samples. The classification subsystem 130 may classify the audio portions such that user selection 305 and matching audio portions 310, 315, 320, 325, and 330 are identified. A depiction similar to the waveform 300 with highlighted user selection 305 and highlighted matching audio portions 310, 315, 320, 325, and 330 (and all other non-matching portions not highlighted) may be provided to the user via UI subsystem 110. The user may, for example, reject the classification of matching audio portion 330. The system may re-analyze the audio recording represented by waveform 300 using the rejected classification of audio portion 330. In some embodiments, the matching audio portions 310, 315, 320, 325, and 330 are removed from the audio recording (e.g., when the user selection 305 is a filler word the user wants to remove). In some embodiments, the matching audio portions 310, 315, 320, 325, and 330 are marked for transition points in an associated presentation or for synchronization with animation or video transitions using key frame generation. In some embodiments, everything except the matching audio portions 310, 315, 320, 325, and 330 are removed from the audio recording.

Figure 4:
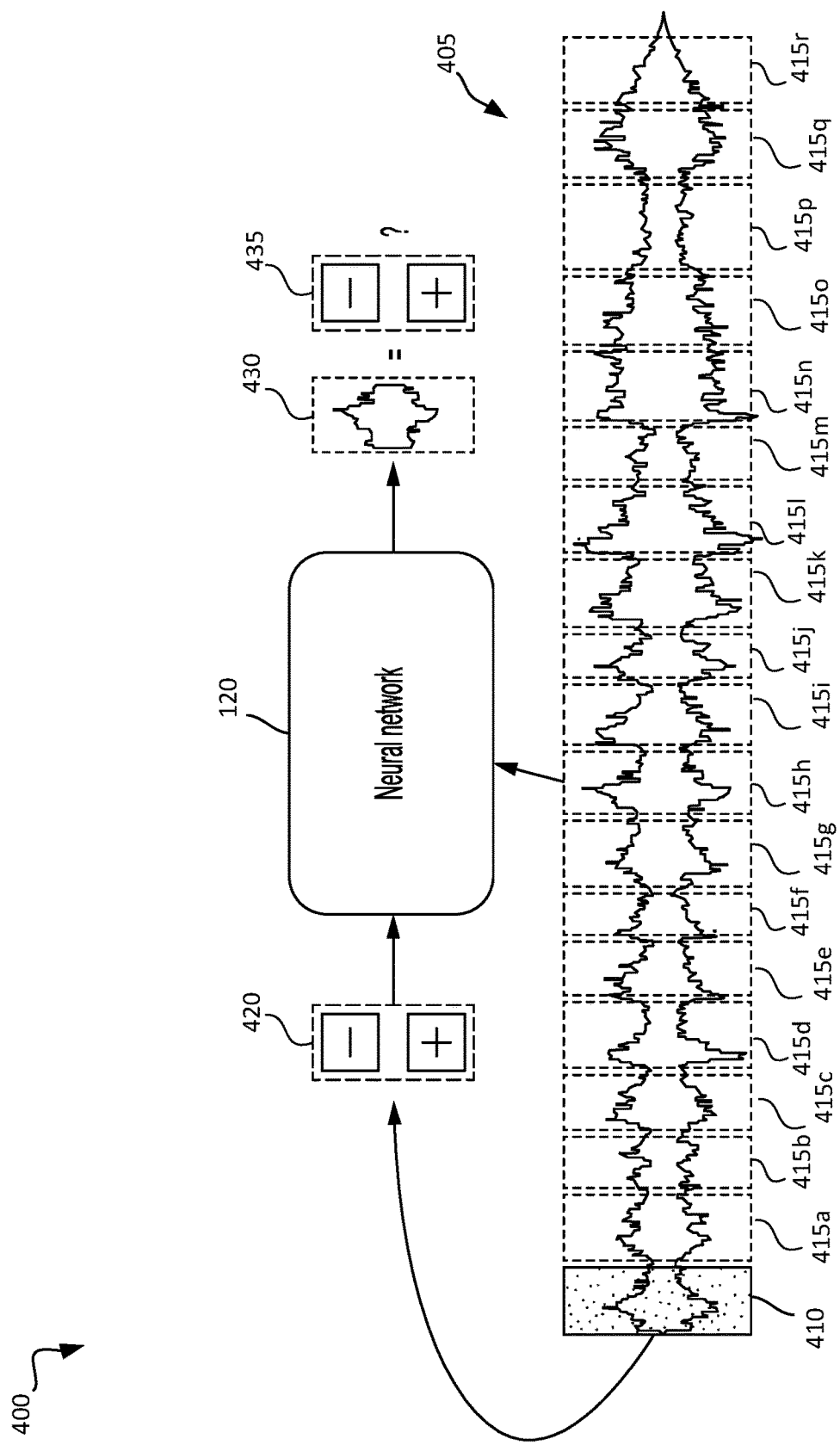
FIG. 4 depicts an example of an audio waveform and trained model to classify the audio portions of an audio recording, according to certain embodiments.

FIG. 4 illustrates an example of a logical model 400 for classifying audio portions 415 of an audio recording represented by waveform 405 using a trained model 175 in a neural network (e.g., neural network 120). The logical model 400 is provided to describe the process of generating the classifications of the audio portions 415. The waveform 405 is a representation of an audio recording that may be displayed to the user for selection of an audio portion. Waveform 405 displays the sound amplitude changes over time as you view the waveform 405 from left to right. The waveform 405 is portioned into audio portions 415. The audio portions 415 depicted in waveform 405 are not the same length in time. For example, audio portion 415p is larger than audio portion 415b.

In the example shown, user selection is of audio portion 410, which is provided as a labeled example by labeler 420 to the trained model 175. Some portions of the audio portions 415 or all audio portions 415 or all audio portions 415 and 410 are provided to the neural network to use in view of the trained embedding model 175 as negative examples by labeler 420. Based on these labeled examples, the neural network may receive audio portions 415 to analyze and generate a feature vector for the audio portion 415 using trained model 175. The feature vector is a numerical representation of the audio portion. In the example shown, audio portion 415h is analyzed using trained model 175, and a feature vector represented by audio portion 430 is generated. Note that the audio portion 430 is slightly different than audio portion 415h. The neural network generates a feature vector for each audio portion in view of the trained model 175 that enhances relevant features such that similar sounds are easy to recognize. Accordingly, the classification 435 can determine, based on the feature vector represented by audio portion 430, in which class the audio portion 415h belongs. In this case, the class options are as labeled positive (match) or negative (non-match).

Figure 5:
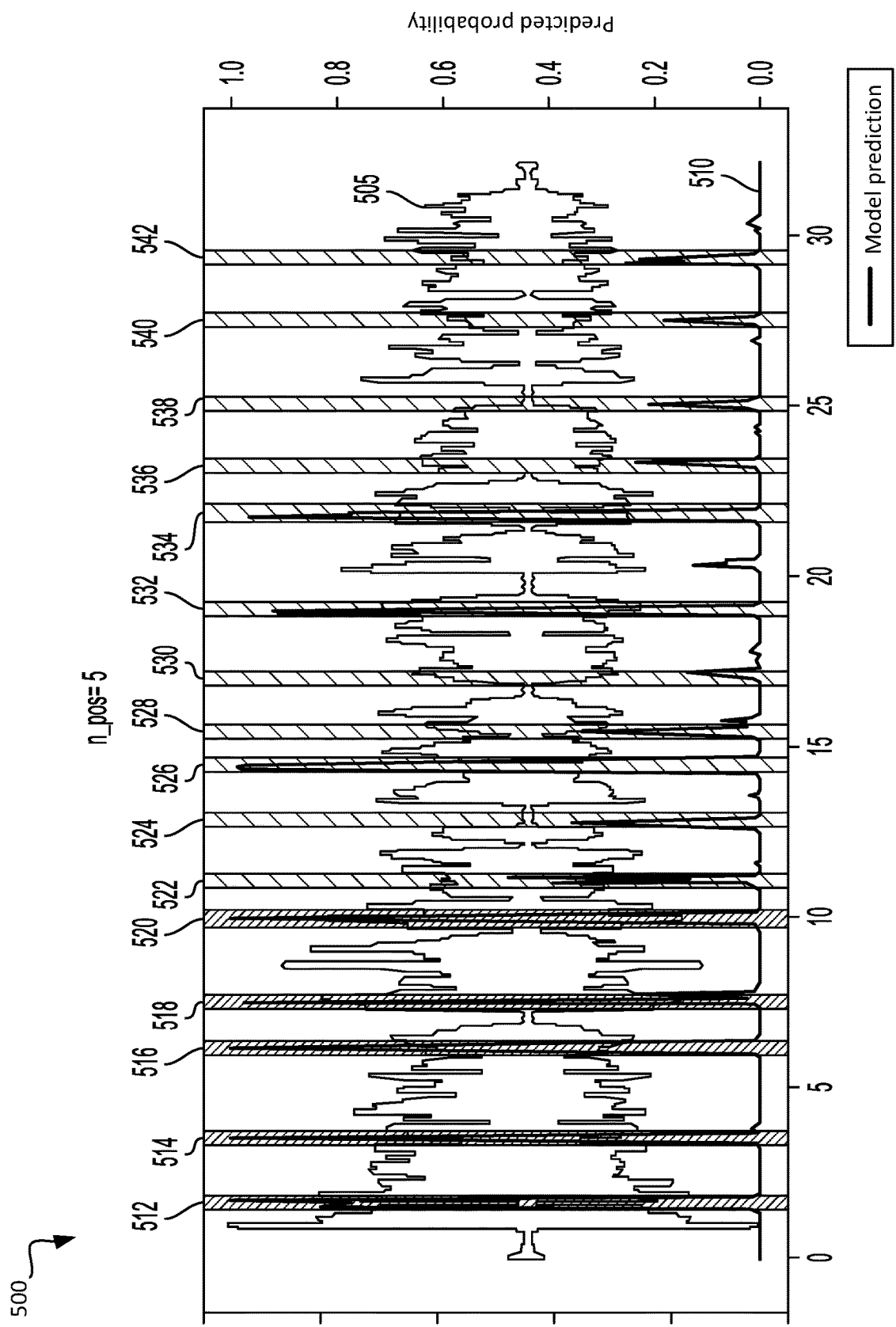
FIG. 5 depicts an example of an output of peak detection used to identify matching audio portions, according to certain embodiments.

FIG. 5 illustrates an example of an output graph 500 of peak detection used to identify matching audio portions. The graph 500 depicts a waveform 505 shown with time as the x-axis and amplitude in the y-axis. The plotted line on waveform 505 is the model prediction 510 using the audio scores generated by comparison subsystem 125. Classification subsystem 130 may output the graph 500 to indicate the peak detection of the model prediction 510. In the example shown, the user selected the audio portions 512, 514, 516, 518, and 520. The audio search and editing system 100 identified audio portions 522, 524, 526, 528, 530, 532, 534, 536, 538, 540, and 542 as matching using peak detection. As shown, the model prediction 510 has a peak at each of the audio portions 522, 524, 526, 528, 530, 532, 534, 536, 538, 540, and 542, which are selected by classification subsystem 130. The graph 500 may be displayed, in some embodiments, to the user via UI subsystem 110.

Figure 6:
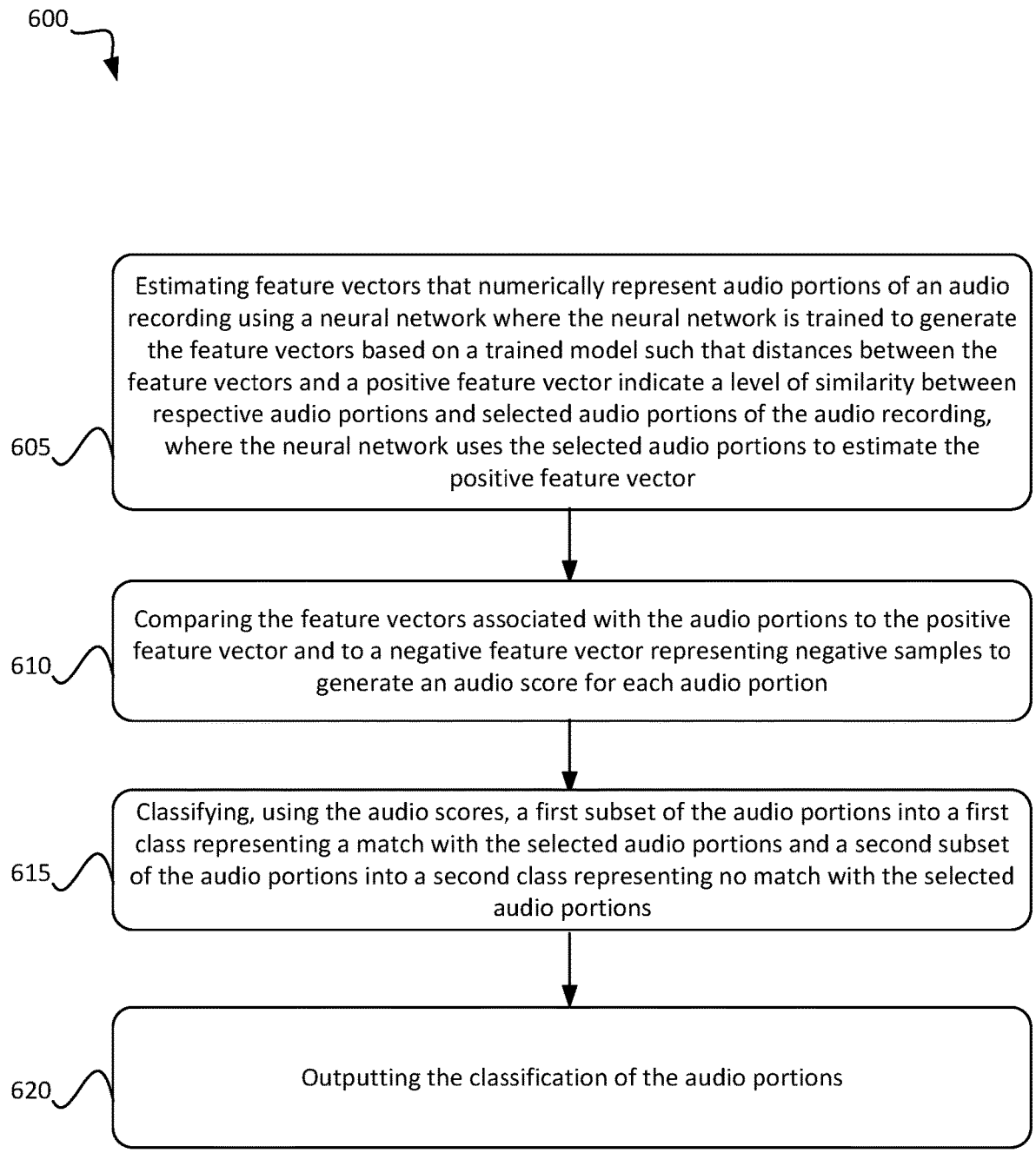
FIG. 6 depicts an example of a process for automatically identifying matching sounds in an audio recording, according to certain embodiments.

FIG. 6 illustrates a process 600 for identifying matching sounds in an audio recording to a selected sound. The process 600 may be performed by audio search and editing system 100. The process 600 begins at step 605 with the neural network 120 estimating feature vectors that numerically represent audio portions of an audio recording. The neural network 120 is trained to generate the feature vectors such that the distance between feature vectors indicates a level of similarity between the respective audio portions. The neural network 120 uses a trained model 175 to estimate the feature vectors. For example, the preprocessing subsystem 115 may preprocess the audio recording to convert the audio recording into an audio representation and generate audio portions of the audio representation. The preprocessing subsystem 115 can receive user selections of audio portions to use as positive samples for the neural network 120, use some or all of the audio portions as negative samples for the neural network 120, and submit the audio portions as a query to the neural network 120 for analyzing in view of the trained model 175. The neural network 120 estimates a feature vector for each audio portion, positive sample, and negative sample based on the trained model 175.

At step 610, the audio search and editing system 100 compares the feature vectors associated with the audio portions to a positive feature vector representing the positive samples and to a feature vector representing the negative samples to generate an audio score for each audio portion. For example, the comparison subsystem 125 generates a positive feature vector by combining the feature vectors representing the positive samples using, for example, a weighted average function, a max function, or some other learned function. The comparison subsystem 125 may further generate a negative feature vector by combining the feature vectors representing the negative samples in a similar manner. The comparison subsystem 125 compares the feature vectors for the respective audio portions with the positive feature vector and the negative feature vector to generate an audio score for the respective audio portions. The audio score provides a numerical indication of the level of similarity between the respective audio portion and the positive feature vector.

At step 615 the audio search and editing system 100 uses the audio scores to classify a first subset of the audio portions into a first class representing a match with the selected audio portions and a second subset of the audio portions into a second class representing no match with the selected audio portions. For example, the classification subsystem 130 can use the audio scores to classify the first and second subsets by thresholding of the audio scores. In some embodiments, the classification subsystem 130 can use peak detection as shown in FIG. 5 to identify the first and second subsets of audio portions.

At step 620, the audio search and editing system 100 outputs the classification of the audio portions. For example, the UI subsystem 110 can provide a graphical representation of the audio recording such as the waveform 300 with the identified matching audio portions 310, 315, 320, 325, and 330 highlighted.

Examples of Computing Environments for Implementing Certain Embodiments

Figure 7:
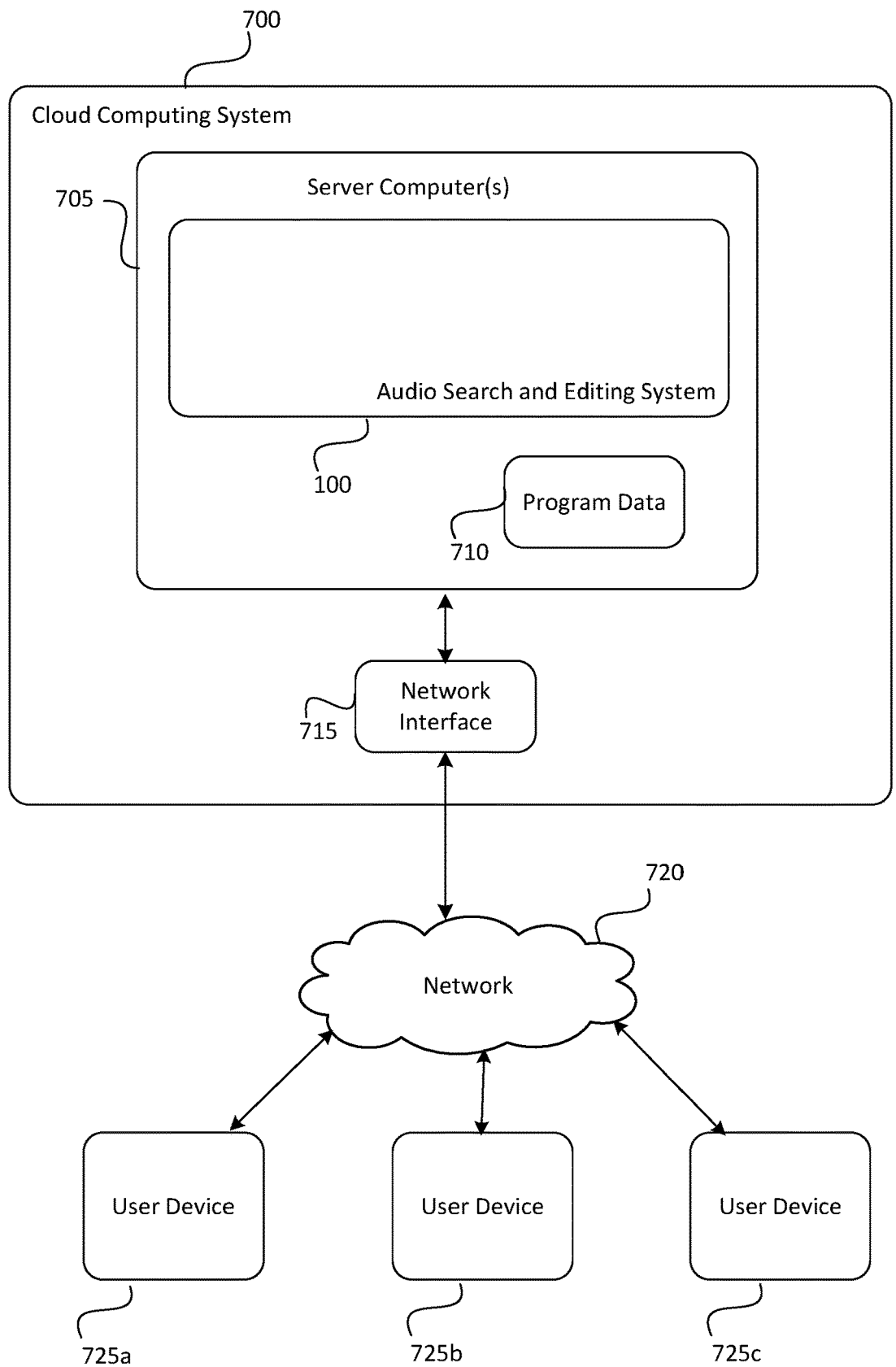
FIG. 7 depicts an example of a cloud computing system that may implement the audio search and editing system, according to certain embodiments.
Figure 8:
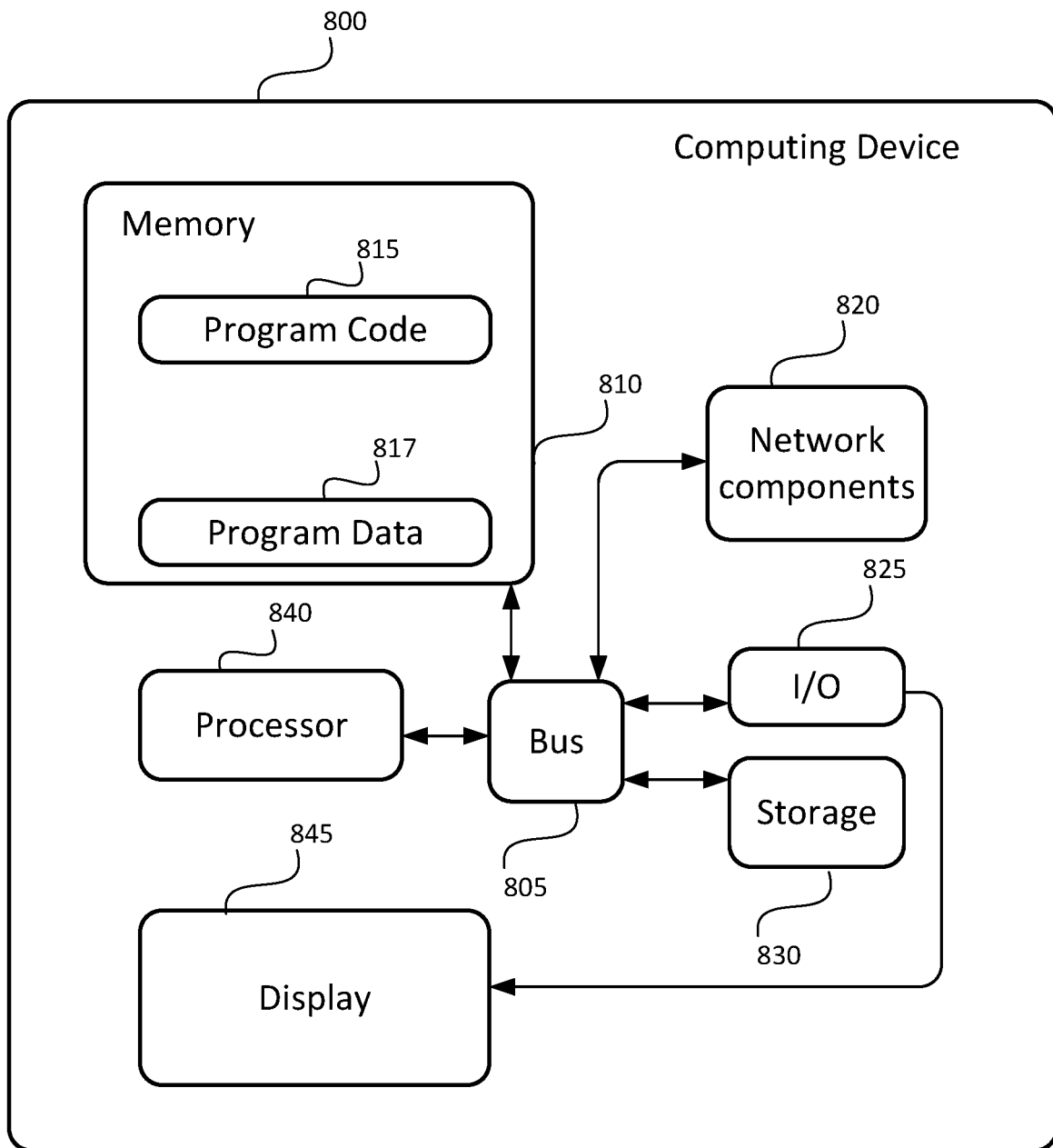
FIG. 8 depicts an example of a computing device that may implement the audio search and editing system, according to certain embodiments.

Any suitable computing system or group of computing systems can be used for performing the operations described herein. For example, FIG. 7 illustrates a cloud computing system 700 by which at least a portion of the audio search and editing system 100 may be offered. FIG. 8 depicts an example of a computing device 800 that may be at least a portion of audio search and editing system 100. The implementation of the computing device 800 could be used for one or more of the sound editor 105 or the user system 135. In an embodiment, a single audio search and editing system 100 having devices similar to those depicted in FIG. 8 (e.g., a processor, a memory, etc.) combines the one or more operations and data stores depicted as separate subsystems in FIG. 1.

In some embodiments, the functionality provided by the audio search and editing system 100 may be offered as cloud services by a cloud service provider. For example, FIG. 7 depicts an example of a cloud computing system 700 offering an audio search service that can be used by a number of user subscribers using user devices 725a, 725b, and 725c across a data network 720. User devices 725a, 725b, and 725c could be examples of a user system 135 described above. In the example, the audio search service may be offered under a Software as a Service (SaaS) model. One or more users may subscribe to the audio search service, and the cloud computing system performs the processing to provide the audio search service to subscribers. The cloud computing system may include one or more remote server computers 705.

The remote server computers 705 include any suitable non-transitory computer-readable medium for storing program code (e.g., an audio search and editing system 100) and program data 710, or both, which is used by the cloud computing system 700 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 705 can include volatile memory, non-volatile memory, or a combination thereof.

One or more of the servers 705 execute the program code 710 that configures one or more processors of the server computers 705 to perform one or more of the operations that provide audio search services, including the ability to utilize the preprocessing subsystem 115, the neural network 120, the comparison subsystem 125, and the classification subsystem 130 to perform audio editing. As depicted in the embodiment in FIG. 7, the one or more servers provide the services to perform audio editing via the audio search and editing system 100. Any other suitable systems or subsystems that perform one or more operations described herein (e.g., one or more development systems for configuring an interactive user interface) can also be implemented by the cloud computing system 700.

In certain embodiments, the cloud computing system 700 may implement the services by executing program code and/or using program data 710, which may be resident in a memory device of the server computers 705 or any suitable computer-readable medium and may be executed by the processors of the server computers 705 or any other suitable processor.

In some embodiments, the program data 710 includes one or more datasets and models described herein. Examples of these datasets include audio data, spectrogram data, etc. In some embodiments, one or more of data sets, models, and functions are stored in the same memory device. In additional or alternative embodiments, one or more of the programs, data sets, models, and functions described herein are stored in different memory devices accessible via the data network 715.

The cloud computing system 700 also includes a network interface device 715 that enable communications to and from cloud computing system 700. In certain embodiments, the network interface device 715 includes any device or group of devices suitable for establishing a wired or wireless data connection to the data networks 720. Non-limiting examples of the network interface device 715 include an Ethernet network adapter, a modem, and/or the like. The audio search and editing system 100 is able to communicate with the user devices 725a, 725b, and 725c via the data network 720 using the network interface device 715.

FIG. 8 illustrates a block diagram of an example of a computer system 800. Computer system 800 can be any of the described computers herein including, for example, audio search and editing system 100, user system 135, or server computer 705. The computing device 800 can be or include, for example, a laptop computer, desktop computer, tablet, server, or other electronic device.

The computing device 800 can include a processor 840 interfaced with other hardware via a bus 805. A memory 810, which can include any suitable tangible (and non-transitory) computer readable medium, such as RAM, ROM, EEPROM, or the like, can embody program components (e.g., program code 815) that configure operation of the computing device 800. Memory 810 can store the program code 815, program data 817, or both. In some examples, the computing device 800 can include input/output ("I/O") interface components 825 (e.g., for interfacing with a display 845, keyboard, mouse, and the like) and additional storage 830.

The computing device 800 executes program code 815 that configures the processor 840 to perform one or more of the operations described herein. Examples of the program code 815 include, in various embodiments, the neural network 120, the preprocessing subsystem 115, the comparison subsystem 125, the classification subsystem 130, or any other suitable systems or subsystems that perform one or more operations described herein (e.g., one or more development systems for configuring an interactive user interface). The program code 815 may be resident in the memory 810 or any suitable computer-readable medium and may be executed by the processor 840 or any other suitable processor.

The computing device 800 may generate or receive program data 817 by virtue of executing the program code 815. For example, audio recordings, audio portions, and waveform 300 are all examples of program data 817 that may be used by the computing device 800 during execution of the program code 815.

The computing device 800 can include network components 820. Network components 820 can represent one or more of any components that facilitate a network connection. In some examples, the network components 820 can facilitate a wireless connection and include wireless interfaces such as IEEE 802.11, Bluetooth, or radio interfaces for accessing cellular telephone networks (e.g., a transceiver/antenna for accessing CDMA, GSM, UMTS, or other mobile communications network). In other examples, the network components 820 can be wired and can include interfaces such as Ethernet, USB, or IEEE 1394.

Although FIG. 8 depicts a single computing device 800 with a single processor 840, the system can include any number of computing devices 800 and any number of processors 840. For example, multiple computing devices 800 or multiple processors 840 can be distributed over a wired or wireless network (e.g., a Wide Area Network, Local Area Network, or the Internet). The multiple computing devices 800 or multiple processors 840 can perform any of the steps of the present disclosure individually or in coordination with one another.

General Considerations

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device. The order of the blocks presented in the examples above can be varied—for example, blocks can be re-ordered, combined, and/or broken into sub-blocks. Certain blocks or processes can be performed in parallel.

What is claimed is:

1. A computer-implemented method for identifying matching sounds in an audio recording having audio portions, the method comprising:

estimating, by a neural network, feature vectors comprising numerical representations of the audio portions, respectively, wherein the neural network is episodically trained using metric-based, few-shot learning to estimate the feature vectors based on a trained model such that distances between the feature vectors and a positive feature vector indicate a level of similarity between respective audio portions and selected audio portions of the audio recording, and wherein the neural network uses the selected audio portions to estimate the positive feature vector;

comparing the feature vectors associated with the audio portions, respectively, to the positive feature vector and to a negative feature vector representing negative samples to generate an audio score associated with the audio portions, respectively;

classifying, with the audio scores, a first subset of the audio portions into a first class representing a match with the selected audio portions and a second subset of the audio portions into a second class representing no match with the selected audio portions; and outputting the classification of the audio portions.

2. The computer-implemented method for identifying matching sounds in the audio recording of claim 1, wherein the neural network uses at least some of the audio portions as the negative samples for estimating the feature vectors.

3. The computer-implemented method for identifying matching sounds in the audio recording of claim 1, wherein the feature vectors associated with the selected audio portions are combined to generate the positive feature vector.

4. The computer-implemented method for identifying matching sounds in the audio recording of claim 1, further comprising:

time shifting the selection of the selected audio portions to generate additional selected audio portions, wherein the neural network uses the additional selected audio portions as positive samples for estimating the feature vectors.

5. The computer-implemented method for identifying matching sounds in the audio recording of claim 1, further comprising:

receiving user feedback on the classification of the audio portions; and recalculating, by the neural network, the positive feature vector, the negative feature vector, or the positive feature vector and the negative feature vector using the user feedback to identify changes in the feature vectors used for calculating the positive feature vector, the negative feature vector, or the positive feature vector and the negative feature vector, respectively.

6. The computer-implemented method for identifying matching sounds in the audio recording of claim 1, wherein a first audio portion overlaps a second audio portion of the audio recording.

7. The computer-implemented method for identifying matching sounds in the audio recording of claim 1, further comprises identifying a center time region of the matching sounds using peak detection.

8. The computer-implemented method for identifying matching sounds in the audio recording of claim 1, wherein the selected audio portions are selected by a user.

9. The computer-implemented method for identifying matching sounds in the audio recording of claim 1, further comprising:

converting the audio recording into a spectrogram; and generating the audio portions by selecting frames of the spectrogram.

10. The computer-implemented method for identifying matching sounds in the audio recording of claim 1, further comprising:

deleting, from the audio recording, the first subset of the audio portions.

11. The computer-implemented method for identifying matching sounds in the audio recording of claim 1, wherein outputting the classification of the audio portions comprises:

converting the audio recording into a spectrogram; and highlighting the first subset of the audio portions in the spectrogram for display on a user device.

12. The computer-implemented method for identifying matching sounds in the audio recording of claim 1, further comprising:

performing key frame generation with the first subset of the audio portions.

13. A system, comprising:

one or more processors; and a memory having stored thereon instructions that, when executed by the one or more processors, cause the one or more processors to:

receive an audio recording comprising a plurality of audio portions;

estimate, using a neural network configured using metric-based few-shot learning techniques with episodic training, feature vectors comprising numerical representations of the audio portions, respectively;

generate a positive feature vector representing selected audio portions of the audio recording, the selected audio portions representing positive samples;

comparing the feature vectors associated with the audio portions, respectively, to the positive feature vector and to a negative feature vector representing negative samples to generate an audio score associated with the audio portions, respectively;

classifying, with the audio scores, a first subset of the audio portions into a first class representing a match with the selected audio portions and a second subset of the audio portions into a second class representing no match with the selected audio portions; and outputting the classification of the audio portions.

14. The system of claim 13, wherein at least some of the audio portions are used for the negative samples.

15. The system of claim 13, wherein the feature vectors associated with the selected audio portions are combined to generate the positive feature vector.

16. The system of claim 13, wherein the instructions comprise further instructions that, when executed by the one or more processors, cause the one or more processors to time shift the selection of the selected audio portions to generate additional selected audio portions.

17. The system of claim 13, wherein the instructions cause the one or more processors to identify a center time region of the match using peak detection.

18. A non-transitory computer-readable medium having stored thereon instructions for identifying matching sounds in an audio recording having audio portions that, when executed by one or more processors, cause the one or more processors to:

estimate feature vectors comprising numerical representations of the audio portions, respectively, wherein the feature vectors are estimated using a neural network episodically trained using metric-based, few-shot learning, such that distances between the feature vectors and a positive feature vector indicate a level of similarity between respective audio portions and selected audio portions of the audio recording;

compare the feature vectors associated with the audio portions, respectively, to the positive feature vector and to a negative feature vector representing negative samples to generate an audio score associated with the audio portions, respectively;

classify, with the audio scores, a first subset of the audio portions into a first class representing a match with the selected audio portions and a second subset of the audio portions into a second class representing no match with the selected audio portions; and output the classification of the audio portions.

19. The non-transitory computer-readable medium of claim 18, wherein at least some of the audio portions are used for the negative samples.

20. The non-transitory computer-readable medium of claim 18, wherein the feature vectors associated with the selected audio portions are combined to generate the positive feature vector.

* * * * *